3,737,457
PROCESS FOR MAKING COMPOUNDS CONTAINING THE SULFONYL CYANIDE GROUP
John Michael Cox and Ranajit Ghosh, Bracknell, England, assignors to Imperial Chemical Industries Limited, London, England
No Drawing. Filed May 15, 1969, Ser. No. 825,042
Claims priority, application Great Britain, June 13, 1968, 28,228/68
Int. Cl. C07c *161/00*
U.S. Cl. 260—545 R                    9 Claims

ABSTRACT OF THE DISCLOSURE

A process for making compounds containing the sulphonyl cyanide group, $SO_2CN$, which comprises reacting a salt of a sulphinic acid with cyanogen chloride.

---

This invention relates to a process for synthesising nitrile compounds, to compounds produced thereby, and to pesticidal compositions containing them.

In "Chemical Communications" 1968, p. 440, A.M. van Leusen et al. discloses the compound toluene p-sulphonyl cyanide which contains the new functional group sulphonyl cyanide, —$SO_2CN$. The van Leusen synthesis employs tolyl p-sulphonyl methylenetriphenylphosphorane. This compound is not at present commercially available and has to be prepared by a multi-stage process.

We have now discovered a much simpler route to compounds containing the sulphonyl cyanide group.

According to the present invention we provide a process for the manufacture of compounds containing the sulphonyl cyanide group which comprises reacting a salt of a sulphinic acid with cyanogen chloride.

Suitable sulphinic acids are those having the formula R—$SO_2H$ where R is an organic radical; preferably R is a hydrocarbon radical, for example, an alkyl radical, straight chain or branched, having from 1–16 carbon atoms; or it may be an unsaturated radical, for example an alkenyl radical; or it may be a cycloalkyl radical, for example cyclohexyl or cyclopentyl, or it may be an aromatic radical for example a phenyl radical. Optionally R may be substituted. Thus, for example when R represents a phenyl radical the latter may bear at least one of the following substituent atoms or groups: alkyl, halogen, alkoxy, carboxyl, nitro and acylamino. R may also represent a substituted or unsubstituted heterocyclic ring.

Preferred sulphinic acid salts are these of group I metals, for example sodium and potassium.

The reaction is generally found to proceed spontaneously at room temperature without the application of heat or super-atmospheric pressure; nor is it generally necessary to use a catalyst to initiate or promote the reaction; a preferred procedure is to simply saturate a solution, e.g. an aqueous solution, of the sulphinic acid salt with cyanogen chloride in liquid or gaseous form.

If desired, the sulphinic acid salt may be prepared in situ, for example from the corresponding sulphonyl chloride or bromide. Conveniently the sulphonyl chloride is reduced with zinc dust and the zinc sulphinate converted by treatment with, e.g., sodium carbonate to give the sodium sulphinate; alternatively the sulphonyl chloride is treated with an aqueous solution of an alkali metal sulphite, e.g. sodium sulphite together with sufficient of a solution of an alkali-metal hydroxide, e.g. sodium hydroxide, as necessary to maintain the pH of the reaction mixture at about a value of 9. The sulphonyl cyanide is then prepared by the addition of cyanogen chloride to the reaction mixture. Alternatively, an organic halide may be converted into a sulphinate salt by reaction of its Grignard complex with sulphur dioxide, followed by treatment with an alkali metal carbonate.

The invention also comprises new sulphonyl cyanide compounds which may be made by the process described. In particular it comprises compounds of the formula $R \cdot SO_2CN$ wherein R is an alkyl or aryl group, optionally substituted; provided that R is not a para-tolyl group. Preferred compounds are those corresponding to the process preferments recited in the fifth paragraph of this application.

The following examples illustrate compounds and methods for their preparation, within the invention.

EXAMPLE I

This example illustrates the preparation of the compound having the structural formula:

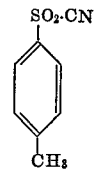

A suspension of sodium toluene p-sulphinate (5.0 grams) in ether (50 ml.) was saturated with cyanogen chloride for 15 minutes and then stirred overnight at room temperature. The reaction mixture was filtered and evaporated to give toluene p-sulphonyl cyanide (3.2 grams), melting point 47–48° C. Two recrystallizations from petroleum ether (boiling point 40–60° C.) were analytically pure material of melting point 49–50° C. The compound showed infra-red absorption maxima at 2190, 1375 and 1170 cm.$^{-1}$. The molecular formula $C_8H_7NO_2S$ requires: C, 53.0; H, 3.9; N, 7.7. Found: C, 52.9; H, 4.0; N, 8.0%. Mass spectra and nuclear magnetic resonance data are consistent with the proposed structure.

EXAMPLE 2

This example illustrates the preparation by a different method, of the compound having the structural formula:

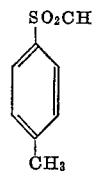

Cyanogen chloride was passed into a solution of sodium toluene p-sulphinate (5.0 grams) in water (50 ml.) for 5 minutes. After a further 5 minutes, the mixture was extracted with ether and the ethereal solution dried, filtered and evaporated to give toluene p-sulphonyl cyanide (3.0 g., melting point 48–49°) of analytical purity of the order recited in Example 1.

EXAMPLE 3

This example illustrates the preparation of 1-hexane sulphonyl cyanide having the structural formula:

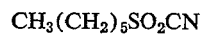

$$CH_3(CH_2)_5SO_2CN$$

A mixture of magnesium turnings (6.7 g.), 1-bromohexane (3.5 g.), a crystal of iodine, and dry ether (50 ml.) was refluxed until the exothermic reaction was initiated. A solution of 1-bromohexane (37.8 g.) in dry ether (150 ml.) was then added at such a rate as to maintain reflux. It was then refluxed for 45 minutes, cooled to —50° and saturated with sulphur dioxide whilst maintaining the temperature below —35°. The precipitate was extracted with a hot saturated aqueous sodium carbonate solution and the filtrate extracted with ether and petroleum (B.P. 60–80°). It was then saturated with cyanogen chloride for 30 minutes, and extracted with ether. The extract was washed with brine, dried over sodium sulphate, filtered, evaporated and distilled to give 1-hexane sulphonyl cyanide (6.2 g.), B.P. 77°/0.2 mm.; $n_D^{24}$ 1.4390; ν max. 2190, 1375, 1170 cm.⁻¹., $C_7H_{13}NO_2S$ requires: C, 48.0; H, 7.5; N, 8.0; S, 18.3. Found: C, 47.6; H, 8.0; N, 7.8; S, 18.2%.

EXAMPLE 4

This example illustrates the preparation of benzene sulphonyl cyanide having the structural formula:

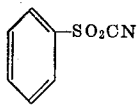

Cyanogen chloride was passed into a solution of sodium benzene sulphinate dihydrate (20.0 g.) in water (150 ml.) for twenty minutes. The mixture was extracted with ether and the extract washed with brine, dried, filtered, evaporated and distilled to give benzene sulphonyl cyanide (15.3 g.); B.P. 73°/0.1 mm.; M.P. 19–20°; $n_D^{20}$ 1.5305; ν max. 2190, 1375; 1170 cm.⁻¹.

EXAMPLE 5

This example illustrates the preparation of methane sulphonyl cyanide having the structural formula:

$$CH_3SO_2CN$$

A solution of methane sulphonyl chloride (34.4 g.) in ether) (25 ml.) was added to a suspension of activated zinc powder (60 g.), water (3 ml.) and ether (300 ml.) at such a rate as to maintain gentle reflux. After refluxing for a further ninety minutes, the mixture was cooled, filtered and the solids exhaustively extracted with hot water. The aqueous portion of the combined filtrate was made basic with aqueous sodium carbonate solution and the gelatinous precipitate removed by filtration through celite. The filtrate was cooled to about −5°, treated with cyanogen chloride for twenty minutes, and extracted with ether. The extract was washed with brine, dried and evaporated at room temperature to give methane sulphonyl cyanide (29 g.) as a pure liquid which decomposed over a period of hours at room temperature and weeks at −5°. $n_D^{24}$ 1.4281; ν max. 2200, 1370, 1175 cm.⁻¹. $C_2H_3NO_2S$ requires: C, 22.86; H, 2.87. Found: C, 24.6; H, 3.3%.

EXAMPLE 6

This example illustrates the preparation of 4-chlorophenyl sulphonyl cyanide having the structural formula:

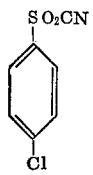

A solution of 4-chlorophenylsulphonyl chloride (52.2 g.) in ether (300 ml.) was added to a mixture of activated zinc (50 g.), water (15 ml.) and ether (250 ml.) at such a rate as to maintain gentle reflux. After refluxing for a further ninety minutes, the mixture was cooled, diluted with water (300 ml.) and filtered. The aqueous phase was made basic with sodium carbonate solution, combined with the solids and heated for one hour at 100°. The mixture was again filtered and the filtrate treated with cyanogen chloride for two hours, then extracted with ether. The extract was washed, dried, and evaporated and the residue recrystallized from petroleum (B.P. 46–60°) to give p-chlorophenylsulphonyl cyanide (26.5 g.), M.P. 56–68°; ν max. 2180, 1375, 1185 cm.⁻¹. $C_7H_4ClO_2NS$ requires: C, 41.70; H, 2.00; N, 6.95. Found: C, 41.7; H, 2.4; N, 6.7%.

EXAMPLE 7

This example illustrates the preparation of 4-methoxyphenylsulphonyl cyanide having the structural formula:

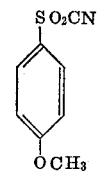

When 4-methoxyphenylsulphonyl chloride (51.7 g.) was treated as described in Example 6, 4-methoxyphenylsulphonyl cyanide (43 g.) was obtained, M.P. 67–68°; ν max. 2190, 1375, 1170 cm.⁻¹. $C_8H_7NO_3S$ requires: C, 48.72; H, 3.58; N, 7.10. Found: C, 48.4; H, 4.0; N, 7.0%.

EXAMPLE 8

This example illustrates the preparation of 3-carboxy-4-chlorophenylsulphonyl cyanide having the structural formula:

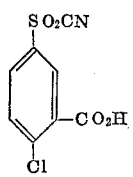

A mixture of 3-carboxy-4-chlorophenylsulphonyl chloride (25.5 g.), activated zinc (50 g.) cupric sulphate (5 g.), hydrochloric acid (40 ml., 2 N) and ether (500 ml.) was refluxed for four hours, cooled and filtered. The aqueous portion of the filtrate was made basic with sodium carbonate solution, combined with the solids, and heated for one hour at 100°. The mixture was again filtered and the filtrate treated with cyanogen chloride for two hours, acidified to pH 2 and extracted with ether. The extract was washed with brine, dried and evaporated and the residue recrystallized from benzene-petroleum (B.P. 40–60°) to give 3-carboxy-4-chlorophenylsulphonyl cyanide (5.4 g.), M.P. 136–7° (decomposition); ν max. 2190, 1380, 1180 cm.⁻¹. $C_8H_4ClNO_4S$ requires: C, 39.1; H, 1.64; N, 5.70. Found: C, 39.2; H, 1.96; N, 5.0%.

EXAMPLE 9

This example illustrates the preparation of 4-bromophenylsulphonyl cyanide having the structural formula:

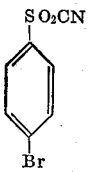

A stirred mixture of 4-bromophenylsulphonyl chloride (25.6 g.), sodium sulphite heptahydrate (150 g.), water (300 ml.) and 2-ethoxyethanol (150 ml.) was maintained at pH 9 by the periodic addition of 40% sodium hydroxide solution. When up-take ceased the mixture was extracted with ether and the aqueous phase treated with cyanogen chloride for one hour. It was then extracted with ether and this extract washed with brine, dried and evaporated. The residue was recrystallized from petroleum (B.P. 60–80°) to give 4-bromophenylsulphonyl cyanide (15.4 g.); M.P. 96–98°; ν max. 2190, 1375, 1180 cm.⁻¹. $C_7H_4BrNO_2S$ requires: C, 34.16; H, 1.64; N, 5.69. Found: C, 34.4; H, 1.6; N, 5.6%.

EXAMPLE 10

This example illustrates the preparation of 4-chloro-3-nitrophenylsulphonyl cyanide having the structural formula:

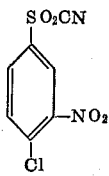

The preparation of this compound was as described in Example 9, except that extractions were carrier out with dichloromethane. The sulphonyl chloride (12.8 g.) yielded the sulphonyl cyanide (4.3 g.) as a white solid, M.P. 81–82°, $\nu$ max. 2190, 1380, 1185 cm.$^{-1}$. $C_7H_3ClN_2O_4S$ requires: C, 34.09; H, 1.22; N, 11.36. Found: C, 31.7; H, 2.0; N, 11.0%. Decomposition took place on recrystallization from petroleum (B.P. 60–80°).

EXAMPLE 11

This example illustrates the preparation of 4-fluorophenylsulphonyl cyanide having the structural formula:

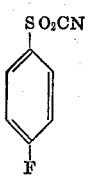

4-fluorophenylsulphonyl chloride (19.4 g.) was treated as in Example 9 to give the sulphonyl cyanide (7.8 g.); B.P. 69–70°/0.08 mm.; $n_D^{19}$ 1.5172. $C_7H_4FNO_2S$ requires: C, 45.40; H, 2.18; N, 7.56. Found: C, 45.9; H, 2.15; N, 7.5%.

EXAMPLE 12

This example illustrates the preparation of 4-acetoamidophenylsulphonyl cyanide having the structural formula:

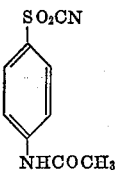

Cyanogen chloride was passed into a mixture of 4-acetamido benzene sulphinic acid (4.0 g.), sodium bicarbonate (4.0 g.), water (100 ml.) and ethanol (25 ml.) for a period of twenty minutes. The mixture was extracted with chloroform and the extract washed with brine, dried and evaporated to 4-acetamidophenylsulphonyl cyanide (4.2 g.); M.P. 163–164° (decomposition); $\nu$ max. 2175, 1375, 1170 cm.$^{-1}$. $C_9H_8N_2O_3S$ requires: C, 48.20; H, 3.6; N, 12.5; S, 14.3. Found: C, 48.2; H, 3.6; N, 12.3; S, 13.8%.

The compounds prepared by the process of our invention are useful as intermediates in the preparation of pharmaceuticals and agricultural chemicals. They also have pesticidal activity, e.g. as fungicides, particularly against the diseases *Sphaerotheca fuliginea* and *Fusarium culmorum*

The compounds of the invention are fungicidal and exhibit activity, in particular, against both seed borne diseases, for example *Fusarium culmorum*, and foliar borne diseases, for example,

*Sphaerotheca fuliginea* (cucumber powdery mildew)
*Podosphaera leucotricha* (apple powdery mildew)
*Plasmopara viticola* (vine downy mildew)
*Phytophthora infestans* (tomato late blight)

A particularly useful feature of the activity of some of the invention compounds is their ability to act individually as systemic pesticides, that is to say, their ability to move in a plant to combat an infection or infestation thereon remote from a site of initial application of a compound. Thus a compound of the invention or a composition containing the same, may be applied to the soil surrounding the roots of a plant and taken up by the plant through its roots to combat pests on the plant.

Some of the invention compounds also exhibit insecticidal and nematocidal activity for example against *Aedes asegypti* and *Meloidogyne incognita*, and some of them display a chemosterilant effect upon red spider mites (*Tetranychus telarius*).

The compounds may be used as such to combat plant pathogens but are more conveniently applied when admixed with a diluent.

In a further aspect, therefore the invention includes pesticidal compositions comprising as an active ingredient a compound as hereinbefore defined.

The compositions of the invetion can be used to combat plant pathogens in a number of ways. Thus they can be applied to the foliage of an infected plant, to seed or to the soil in which plants are growing or to be planted.

In a further aspect, therefore, the invention includes a method for the combating of undesired pests, for example fungal infections or insect infestations, on plants which comprises applying to the plant, to the locus of a plant, or to the seeds of a plant, a pesticidally-active compound as hereinbefore defined or a composition containing it.

In yet a further aspect the invetion includes a method for treating agricultural soil comprising applying to the soil a compound as hereinbefore defined or a composition containing it.

The compositions may be used for agricultural and horticultural purposes and the type of compositions used in any instance will depend upon the particular purpose for which it is to be used.

The compositions may be in the form of dusting powders or granules wherein the active ingredients is mixed with a solid diluent or carrier. Suitable solid diluents or carriers may be, for example kaolin, bentonite, kieselguhr, dolomite, calcium carbonate, talc, powdered magnesia, fuller's earth, gypsum, Hewitt's earth, diatomaceous earth and China clay. Compositions for dressing seed, for example, may comprise an agent assisting the adhesion of the composition to the seed, for example a mineral oil.

The composition may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally solutions, aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example cetyltrimethylammonium bromide. Suitable agents of the anionic type include, for example soaps, salts of aliphatic monoesters of sulphuric acid, for example sodium lauryl sulphate, salts of sulphonated aromatic compounds, for example sodium dodecylbenzenesulphonate, sodium calcium or ammonium lignosulphonate, butyl-naphthalene sulphonte, and a mixture of the sodium salts of diisopropyl- and triisopropyl-naphthalene sulphonic acids. Suitable agents of the non-ionic type include, for example, the condensation products of ethylene oxide with a fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins. Suitable suspending agents, are for example, hydrophilic colloids, for example polyvinylpyrrolidone and sodium carboxymethylcellulose, and the vegetable gums, for example gum acacia ad gum tragacanth.

The aqueous solutions, dispersions or emulsions may be prepared by dissolving the active ingredient or ingredients in an organic solvent which may contain one or more wetting, dispersing or emulsifying agents and then adding the mixture so obtained to water which may likewise contain one or more wettting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compounds of the invention may also be formulated into compositions comprising capsules or microcapsules containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichloromethanes or dichlorodifluoromethane.

By the inclusion of suitable additives, for example for improving the distribution, adhesive power and resistance to rain on treated surfaces, the different compositions can be better adapted for the various uses for which they are intended.

The compounds may also be conveniently formulated by admixing them with fertilizers. A preferred composition of this type comprises granules of fertilizer material incorporating, for example coated with, an invention compound. The fertilizer material may, for example, comprise nitrogen or phosphate- containing substances.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.001% and 1.0% by weight of active ingredient or ingredients may be used.

It is to be understood that the compositions of this invention may comprise, in addition to an invention compound, one or more other compounds having biological activity.

The invention is further illustrated but not limited by the following examples of compositions according to the invention.

EXAMPLE 13

This example illustrates an atomisable fluid comprising a mixture consisting of 25% by weight of the compound produced in Example 7 and 75% by weight of xylene.

EXAMPLE 14

This example illustrates a dusting powder which may be applied directly to plants or other surfaces and comprises 1% by weight of the compound produced in Example 7 and 99% by weight of talc.

EXAMPLE 15

25 parts by weight of the product described in Example 7, 65 parts by weight of xylene, and 10 parts of an alkyl aryl polyether alcohol (Triton X–100; Triton is a trademark) were mixed in a suitable mixer. There was thus obtained an emulsion concentrate which can be mixed with water to produce an emulsion suitable for use in agricultural applications.

EXAMPLE 16

5 parts by weight of the product described in Example 7 were thoroughly mixed in a suitable mixer with 95 parts by weight of talc. There was thus obtained a dusting powder.

EXAMPLE 17

10 parts by weight of the product described in Example 7, 10 parts of an ethylene oxide-octylphenol condensate ("Lissapol" NX; "Lissapol" is a trademark) and 80 parts by weight of diacetone alcohol were thoroughly mixed. There was thus obtained a concentrate which, on mixing with water, gave an aqueous dispersion suitable for application as a spray in the control of insect pests.

EXAMPLE 18

This example illustrates a concentrated liquid formulation in the form of an emulsion. The ingredients listed below were mixed together in the stated proportions and the whole stirred until the constituents were dispersed.

| | Percent wt. |
|---|---|
| Product of Example No. 7 | 20 |
| Lubrol L (Lubrol is a trademark) | 17 |
| Calcium dodecylbenzenesulphonate | 3 |
| Ethylene dichloride | 45 |
| Aromasol H (Aromasol is a trademark) | 15 |
| | 100 |

EXAMPLE 19

The ingredients listed below were ground together in the proportions stated to produce a powdered mixture readily dispersible in liquids.

| | Percent wt. |
|---|---|
| Product of Example No. 7 | 50 |
| Dispersol T (dispersol is a trademark) | 5 |
| China clay | 45 |
| | 100 |

EXAMPLE 20

A composition in the form of grains readily dispersible in a liquid (for example water) was prepared by grinding together the first flour of the ingredients listed below in the presence of water and then the sodium acetate was mixed in. The admixture was dried and passed through a British Standard mesh sieve, size 44–100 to obtain the desired size of grains.

| | Percent wt. |
|---|---|
| Product of Example No. 7 | 50 |
| Dispersol T | 12.5 |
| Calcium lignosulphonate | 5 |
| Soduim dodecylbenzenesulphonate | 12.5 |
| Sodium acetate | 20 |
| | 100 |

EXAMPLE 21

A composition suitable for use as a seed dressing was prepared by mixing all three of the ingredients set out below in the proportions stated.

| | Percent wt. |
|---|---|
| Product of Example No. 7 | 80 |
| Mineral oil | 2 |
| China clay | 18 |
| | 100 |

EXAMPLE 22

A granular composition was prepared by dissolving the active ingredient in a solvent, spraying the solution obtained onto the granules of pumice and allowing the solvent to evaporate.

|  | Percent wt. |
|---|---|
| Product of Example No. 7 | 5 |
| Pumice granules | 95 |
|  | 100 |

EXAMPLE 23

An aqueous dispersion formulation was prepared by mixing and grinding the ingredients recited below in the proportions stated.

|  | Percent wt. |
|---|---|
| Product of Example No. 7 | 40 |
| Calcium lignosulphonate | 10 |
| Water | 50 |
|  | 100 |

The following constitutes an explanation of the compositions or substances represented by the various trademarks and trade names referred to in the foregoing examples.

"LUBROL" L is a condensate of 1 mole of nonyl phenol with 13 molar proportions of ethylene oxide.

"AROMASOL" H is a solvent mixture of alkylbenzenes.

"DISPERSOL" T is a mixture of sodium sulphate and a condensate of formaldehyde with the sodium salt of naphthalene sulphonic acid.

"LUBROL" APN 5 is a condensate of 1 mole of nonyl phenol with 5½ moles of naphthalene oxide.

"CELLOFAS" B 600 is a sodium carboxymethyl cellulose thickener.

"LISSAPOL" NX is a condensate of 1 mole of nonyl phenol with 8 moles of ethylene oxide.

The compounds produced by the examples numbered 1, 2, 3, 4, 7, 8, 9, 10 and 11 were tested against the soil-borne disease *Fusarium culmorum*. The results of this test are set out in Table I below.

In this first test John Innes seeding compost was admixed with a culture of *Fusarium culmorum* grown on an admixture of soil and cornmeal and the entire mixture was then wrapped in brown paper and incubated in the glasshouse for 48 hours. The incubated soil was placed in pots; then seeds (twenty per pot) treated with china clay compositions containing the invention compound in concentration of 1000 parts per million were sown in the pots. Seeds treated with Agrosan (trademark) mercury seed dressing were used as a standard. Counts of the seedling emergent 10 days after sowing were taken and the results converted to a percentage of the seeds sown. Disease assessments were made 17 days after sowing. Calculations are then made whereby the disease control is obtained as a grading.

In the table of the results, Table I below, the figures in the right hand column identify the compounds tested by reference to the example number in this specification relating to the preparation of the compound and the grading scale number is given beneath in parenthesis. The particular disease is represented in the left hand column and the concentration of the compound used is in brackets beneath the disease name. The grading scale is as follows:

| Grading | Percentage amount of disease |
|---|---|
| 0 | 61–100 |
| 1 | 26–60 |
| 2 | 6–25 |
| 3 | 0–5 |

TABLE I

| Disease | Compound number and disease grading |
|---|---|
| Fusarium culmorum (1,000 p.p.m.) | 1(2) 2(1) 3(1) 4(2) 7(3) 8(2) 9(1) 10(1) 11(2) |

Compositions according to the invention were made up and tested against various foliar borne fungal diseases, and the results of these tests are shown hereinafter. In these tests, details of which are given below under the headings A and B, the test plants were either sprayed so that the leaves were wetted, or the surrounding soil drenched with a solution or suspension containing the active compound and 0.1% of a wetting agent when specified.

(A) Spray-applied protectant test

A suspension or solution containing the active compound was sprayed directly onto the leaves of plants, a wetting agent being used when the plant was wheat, barley or rice. After a suitable period of time (time interval A) depending upon the particular plant, the plant was inoculated with the fungus under test and after a further suitable period of time (time interval B) again depending upon the particular plant and fungus, the extent of infection was assessed visually.

| Disease and plant | Time interval of— A Hours | Time interval of— A Days | B, days | Concentration of compound [1] |
|---|---|---|---|---|
| Podosphaera leucotricha (apple) | 24 |  | 7 | 500 |
| Uncinula neactor (vine) | 24 |  | 7 | 500 |
| Piricularia oryzae (rice) | 5 |  | 6 | 500 |
| Phytophthora infestans (tomato) |  | 3 | 3 | 500 |
| Plasmopara viticola (vine) | 5 |  | 11 | 500 |
| Puccinia recondita (wheat) | 5 |  | 8 | 500 |
| Sphaerotheca fuliginea (cucumber) | 24 |  | 7 | 500 |

[1] In composition in parts per million.

(B) Drench-applied protectant test

A suspension or solution containing the active compound was applied to the soil surrounding the plant under test, and the plant was inoculated with the fungus and the extent of infection was assessed visually, as described under test A above.

| Disease and plant | Time interval of— A, hours | B, days | Concentration of compound [1] |
|---|---|---|---|
| Sphaerotheca fuliginea (cucumber) | 72 | 8 | 500 |
| Piricularia oryzae (rice) | 72 | 5 | 500 |
| Phytophthora infestans (tomato) | 72 | 3 | 500 |

[1] In composition in parts per million.

The activity of the compounds against the various fungal infections of plants was recorded in terms of a grading scale, the grading being determined by visual comparison of the percentage amount of disease on the treated plant with that of an infected, but untreated, control plant. The grading scale used was as follows:

| Percent amount of disease | Grading |
|---|---|
| 61–100 | 0 |
| 26–60 | 1 |
| 6–25 | 2 |
| 0–5 | 3 |

The results obtained with various plants and fungi are set out below in Tables II and III corresponding to the results obtained in Tests A and B, respectively.

TABLE II (SPRAY-APPLIED PROTECTANT TEST)

| Disease | Compound number and (disease grading) |
|---|---|
| Tomato late blight (Phytophthora infestans) | 6 (3) |
| Apple powdery mildew (Podosphaera leucotricha) | 3 (3) |
| Cumber powdery mildew (Sphaerotheca fuliginea) | 1 (2), 6 (1) 9 (2) |

TABLE III (DRENCH-APPLIED PROTECTANT TEST)

| Disease | Compound Number and (disease grading) |
|---|---|
| Cucumber powdery mildew (Sphaerotheca fuliginea) | 1 (2), 3 (3), 4 (2), 6 (2), 7 (2) |
| Apple powdery mildew (Podosphaera leucotricha) | 3 (3), 5 (1) |
| Vine downy mildew (Plasmopara viticola) | 4 (2) |

The invention compounds are of considerably lower toxicity to mammals than many known products for combating the above mentioned pests. Thus the compound of Example No. 1 above has an L.D.$_{50}$ figure for oral administration to rats of 800 to 1600 milligrams per kilogram (mg./kg.).

In a further test wherein the plants were first infested with spores of the fungal disease and then sprayed (24 hours later) with the invention compounds (500 p.p.m. active compound) to try to eradicate the disease, the following results were obtained.

| Disease | Compound and (disease grading), assessment 8 days after spraying |
|---|---|
| Cucumber powdery mildew (Sphaerotheca fuliginea) | 6 (1), 7 (2), 8 (1), 9 (1) |

What we claim is:

1. A process for making compounds containing the sulphonyl cyanide group, SO$_2$CN, which comprises reacting a Group I metal salt of a sulphinic acid with cyanogen chloride, said acid having the formula R—SO$_2$H wherein R is alkyl, alkenyl, cycloalkyl or monocyclic aryl.

2. A process according to claim 1 and comprising the step of forming the sulphinic acid salt in situ from the corresponding sulphonyl halide by reducing the sulphonyl halide with zinc dust and treating the resultant zinc sulphinate with an alkali metal carbonate to yield the corresponding alkali metal sulphinate.

3. A process according to claim 1 and comprising the step of forming the sulphinic acid salt in situ from the corresponding sulphonyl halide by reacting a grignard complex of an organic halide with sulphur dioxide followed by treatment with alkali metal carbonate.

4. A process according to claim 1 and comprising the step of forming the sulphinic acid salt in situ from the corresponding sulphonyl halide by treating the sulphonyl halide with a solution of an alkali metal sulphite and adding alkali metal hydroxide as necessary to maintain the pH of the reaction mixture at about a value of 9 as the reaction proceeds.

5. A process according to claim 1 wherein the sulphinic acid has the formula R—SO$_2$H wherein R is an alkyl radical.

6. A process for making compounds containing the sulphonyl cyanide group, SO$_2$CN, which comprises reacting a salt of a sulphinic acid with cyanogen chloride, the sulphinic acid having the formula R—SO$_2$H wherein R is monocyclic aryl and the salt is a sodium or potassium salt.

7. A process according to claim 1 wherein R is hexyl.

8. A process according to claim 6 wherein R is phenyl or alkyl phenyl.

9. A process according to claim 6 wherein R is p-tolyl.

References Cited

Fieser et al., Reagents for Organic Synthesis, pp. 176–7 (1967).

van Leusen et al., Chem. Comm. 1968 440.

Cox et al., Tet. Letters 3351 (1969).

LORRAINE A. WEINBERGER, Primary Examiner

R. GERSTL, Assistant Examiner

U.S. Cl. X.R.

260—397.6, 515 A, 515 M; 424—228, 315